United States Patent Office 2,884,843
Patented May 5, 1959

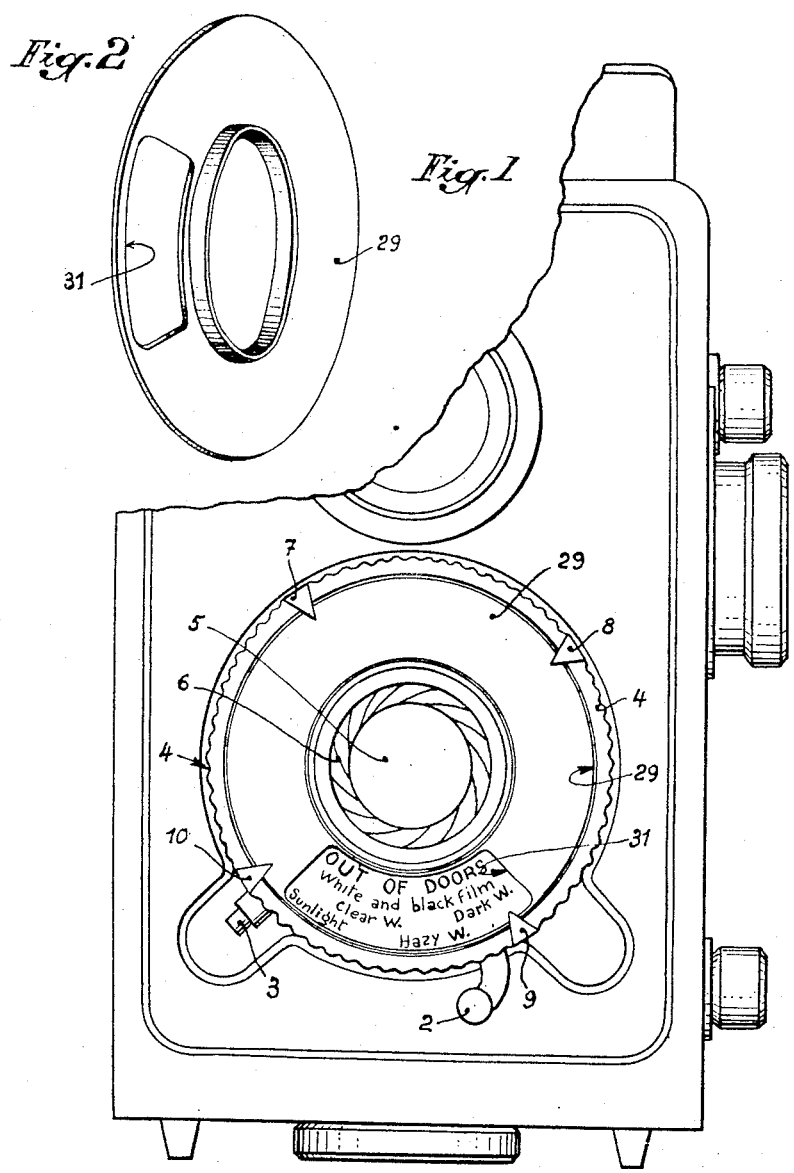

2,884,843
ARRANGEMENT FOR ADJUSTING THE VIEW-TAKING CONDITIONS IN CAMERAS

Paul Ferdinand Royet, Aurec-S/Loire, France

Application February 15, 1956, Serial No. 565,674
Claims priority, application France February 19, 1955

1 Claim. (Cl. 95—64)

The complexity of the operations required before taking views with a camera chiefly when the latter is provided with an objective having a large opening deters many possible amateurs from photographing.

As a matter of fact, in cameras, chiefly in reflex cameras provided with one or two objectives, it is necessary after focusing on a ground glass to provide for the preliminary adjustment of the shutter speed and of the diaphragm as functions of the sensitivity of the emulsion used and of the luminosity of the subject.

In most cases, amateurs resort in practice to a constant shutter speed when taking views, said speed being generally 1/50 of a second.

On the other hand, emulsions generally allow large variations in exposure so that the diaphragm used may be defined to a more or less approximative manner for a given emulsion and a given shutter speed, assumed to be constant.

Taking this into account, it is possible to simplify the adjustment of the cameras for view-taking in the following manner as provided by my invention:

The shutter speed being selected once and for all in the camera structure as equal to say 1/50 of the second, the operator has only to adjust the diaphragm by acting on a control member rigid with at least one mark or pointer adapted to move over a scale of view-taking conditions corresponding to the location of the subject, to the luminosity and to the type of emulsion used whether on a black and white film or a color film.

I have illustrated by way of example in accompanying drawings a preferred embodiment of my improved camera. In said drawings:

Fig. 1 is a front view of said camera provided with my improved adjusting means.

Fig. 2 is a perspective view of a movable annular mask to be positioned in front of the scale system so as to uncover only the scale which is to be used.

Figure 3:
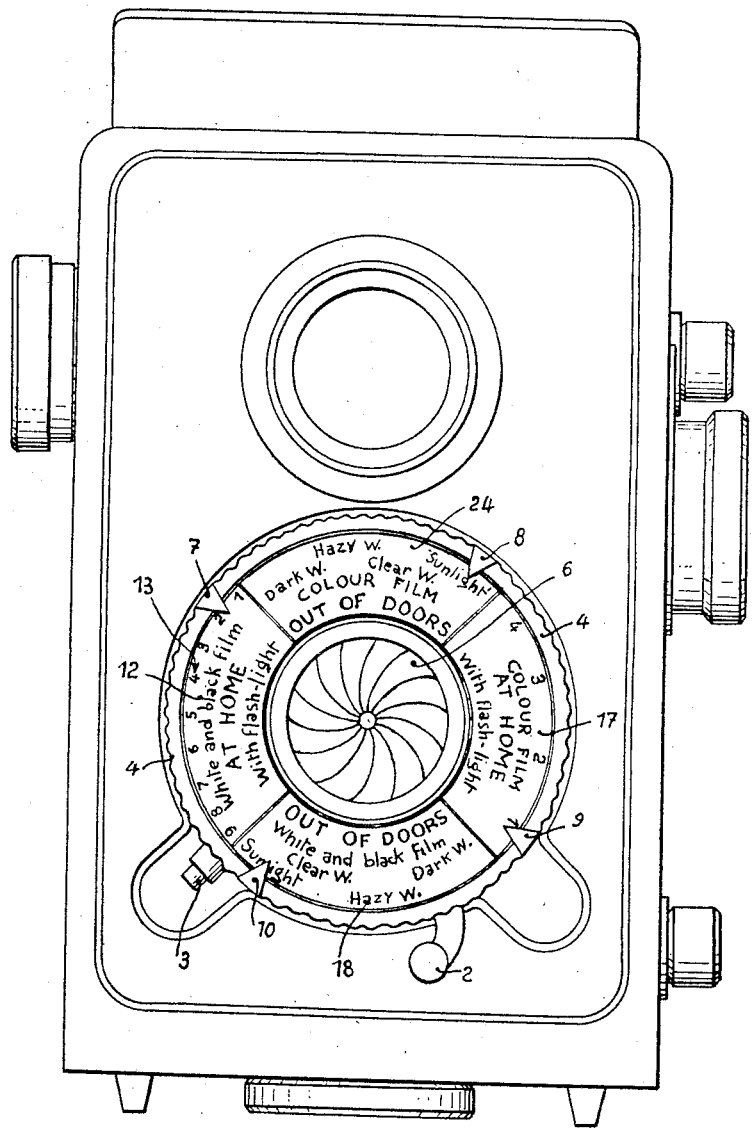
Fig. 3 is a view similar to Fig. 1 after removal of the mask shown in said Fig. 1.

The adjusting system may be controlled by the operator through a releasing lever 2 as illustrated in the Figs. 1 and 3, the mere shifting of said lever producing the view-taking. The camera may furthermore be provided with means which are not illustrated for setting the shutter.

There is also provided as shown at 3 the conventional connection required for connecting the camera if desired with an electronic or the like flash-light.

The arrangement according to my invention is shown as including a stationary ring 4 surrounding the objective 5 adapted to be closed by the diaphragm 6.

Said ring is subdivided into equal sectors, four in the case illustrated. Each of them registers with a movable pointer designated by the reference numbers 7 to 10 and all rigid with the same part controlling the diaphragm 6. Each of the sectors carries indications corresponding to different view-taking conditions.

In the sector 12 appear for instance the indications "At home" with "Flash" and "Black and white film," together with a scale 13 of the distances of the subject with reference to the objective. These indications of distances are valid for a luminous source of a predetermined constant intensity.

The sector 17 may carry the indications "At home" with "Flash" and "Color film" and also a scale of the distances of the subject.

The two other sectors may carry indications relating to views taken out of doors respectively with black and white and with color films; the sector 18 to be used for black and white films carries subdivisions for dark weather, hazy weather, clear weather and sunlight, while the sector 24 carries similar subdivisions to be used for taking views with a color film.

In order to avoid any error in the reading of the scale, said arrangement may be usefully associated with a mask 29 (Fig. 2) constituted for instance by a ring located round the objective and adapted to revolve coaxially with the latter. Said mask includes a gate 31 the surface of which is such that it may register with a sector of the ring 4.

When taking a view with the camera, it is sufficient to angularly shift the mask so as to bring said gate 31 in front of the selected sector, for instance, the sector 18 corresponding to "out of doors" photographing on a "black and white" film and to bring the pointer into register, say with the indication "dark weather" (Fig. 1). At this moment, assuming the focusing has been executed, the only further operation consists in shifting the shutter releasing lever 2 so as to expose the sensitive layer of the emulsion located inside the camera obscura of the apparatus.

The camera thus equipped may be used even by unskilled amateurs since after focusing on the ground glass the only adjustment still required viz. that of the diaphragm aperture is executed through a shifting of the movable pointer in register with the indications of the view-taking conditions read on a stationary board of sector.

The indications carried by the sectors may also include an indication relating to the sensitivity of the emulsion used both for black and white and for color photography.

What I claim is:

In a view taking camera comprising an objective, a mounting for said objective, a shutter, a diaphragm and means for controlling said shutter at a constant fixed speed, the combination of a circular disc coaxial with the objective and supported on the objective mounting, said disc having a plurality of sectors arranged radially about said objective, each sector defining different conditions of locality, luminosity and sensitivity of film emulsion, an indicator for each sector projecting over said disc and adapted to be shifted circumferentially with respect thereto to point to any selected one of said different conditions on said sector, said indicator being connected to said diaphragm so that when the indicator is set to point to any sector, the diaphragm is thereby likewise set in the position corresponding to the condition appearing on the sector in register with said indicator, and a mask fitted over said disc and rotatably supported on said objective mounting, said mask having an opening coextensive in size and shape with that of any one of said sectors, to expose a selected sector to view, said mask blanking out the remaining sectors, said indicator overlying said mask.

References Cited in the file of this patent

UNITED STATES PATENTS

| 883,607 | Andrews | Mar. 31, 1908 |
| 1,623,998 | Cooke | Apr. 12, 1927 |
| 1,662,427 | Krodel et al. | Mar. 13, 1928 |
| 1,788,655 | Beach | Jan. 13, 1931 |
| 2,590,165 | Fairbank et al. | Mar. 25, 1952 |

FOREIGN PATENTS

| 276,613 | Germany | July 17, 1914 |